Nov. 12, 1935.  E. J. SMITH  2,020,620
ROTARY SELF CLEANING HARROW
Filed May 27, 1935
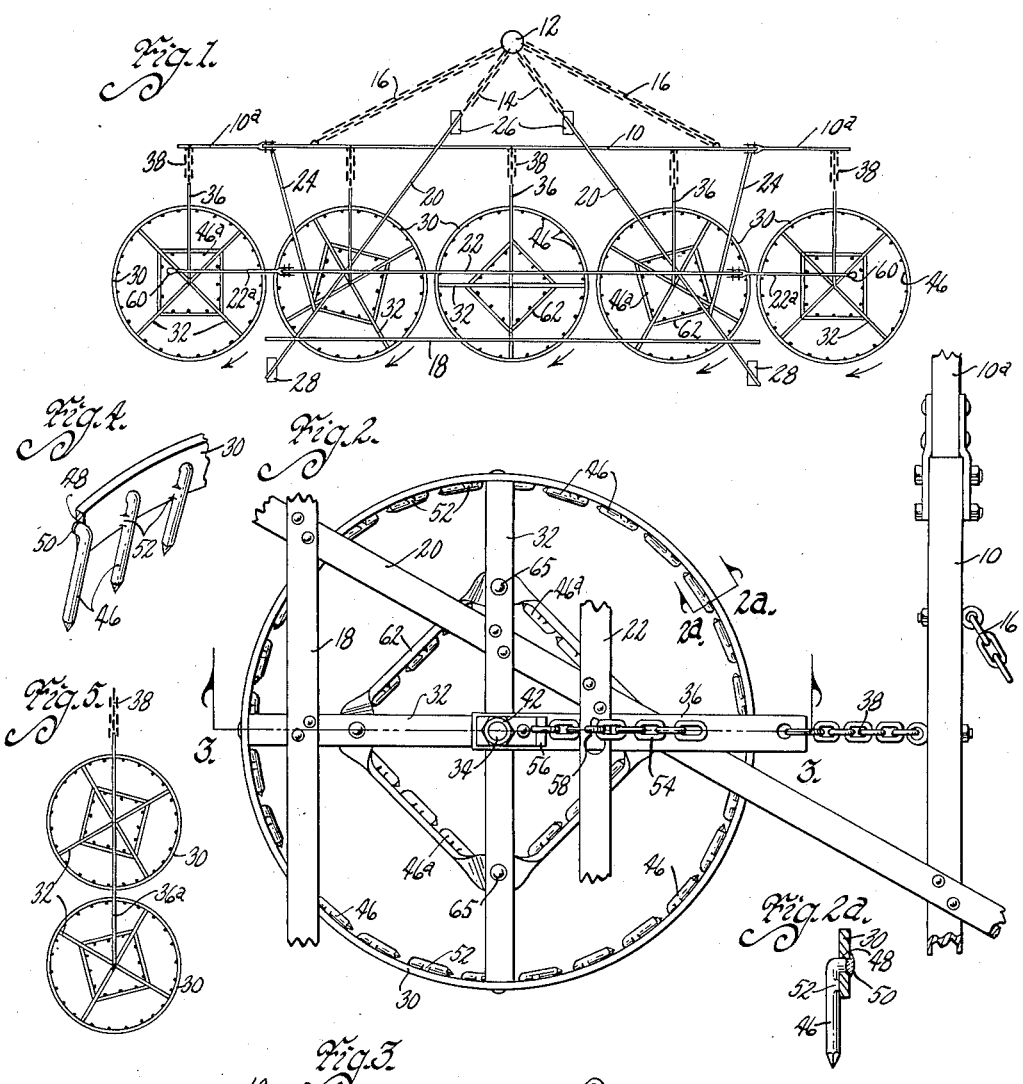
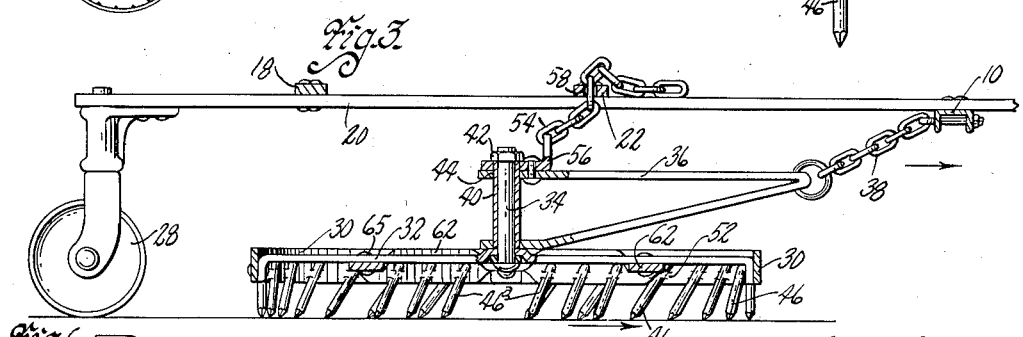
Inventor
Ellsworth Josiah Smith
By Bair, Freeman & Sinclair
Attorneys
Witness
Edw. Seeley Patented Nov. 12, 1935

2,020,620

UNITED STATES PATENT OFFICE 2,020,620

ROTARY SELF-CLEANING HARROW

Elsworth Josiah Smith, Hastings, Iowa

Application May 27, 1935, Serial No. 23,678

10 Claims. (Cl. 55—20)

The object of my invention is to provide a rotary self-cleaning harrow which is simple, durable and comparatively inexpensive to manufacture.

A further object is to provide a rotary harrow having inexpensively manufactured harrow elements arranged to rotate and be supported by a caster wheeled frame.

Another object is to provide means for extending a draw bar of the frame so as to make provision for additional rotary harrow elements.

Still another object is to provide means for adjusting the elevation of the harrow elements relative to the ground surface over which they travel.

With these and other objects in view, my invention consists in the construction, arrangement and combination of the various parts of my device, whereby the objects contemplated are attained, as hereinafter more fully set forth, pointed out in my claims and illustrated in the accompanying drawing, in which:

Figure 1 is a diagrammatic plan view of a rotary self-cleaning harrow embodying my invention.

Figure 2 is an enlarged plan view showing in detail one of the harrow elements.

Figure 2a is an enlarged sectional view on the line 2a—2a of Figure 2 showing how the harrow teeth are welded to a wheel like frame which carries them.

Figure 3 is a sectional view on the line 3—3 of Figure 2.

Figure 4 is a perspective view of a portion of the rim of the harrow element and several of the harrow teeth depending therefrom.

Figure 5 is a diagrammatic view showing how one harrow element may be drawn behind another; and Figure 6 is a side elevation showing a jockey bar used in Figure 5.

On the accompanying drawing, I have used the reference numeral 10 to indicate a draw bar. It is adapted to be drawn by horse or tractor power hitched to a ring 12 which is connected by chains 14 and 16 with the draw bar 10.

The draw bar 10 is part of a frame, the other members of which are indicated at 18, 20, 22 and 24, all of which are rigidly connected together by rivets or the like. The frame is supported by castor wheels 26 and 28.

Rotary harrow elements comprising rims 30, spokes 32, spindles 34 and draft elements 36 are provided for connection with the draw bar 10 by chains 38. The ends of the spokes 32 are secured to the rim 30 and the spindle 34 is secured to the spokes at the center of the rim. By means of a sleeve 40 and nut 42 the spindle 34 is rigidly connected with the spokes and projects at right angles therefrom as clearly shown in Figure 3.

The draft element 36 is illustrated as having a flat bar folded approximately at its center and having its ends spaced and perforated as indicated at 44. The perforations journal the sleeve 40 and thereby the spindle 34.

Secured to the rim 30 are a plurality of harrow teeth 46. These may be projected partly through perforations 48 in the rim 30 and welded as at 50 and 52 to rigidly connect them with the rim.

It will be noted that they depend at an angle from the rim so that on the left side of the rim they are inclined rearwardly and at the right side they are inclined forwardly. This causes right hand rotation of the rotary harrow elements as they are dragged across the ground surface. The rotary action keeps the teeth clean and tends to sharpen them evenly all the way around instead of flattening them on one side as in harrows having non-rotary teeth.

For supporting the rotary harrow elements so that their teeth can project more or less into the ground as desired, I provide supporting chains 54 connected with brackets 56 of the draft elements 36 and extending through key hole slots 58 in the supporting bar 22. The chains 54 may be tightened or loosened as desired to cause shallow or deeper tooth engagement, respectively.

The ends of the supporting bar 22 are provided with eyes 60 to which the horses or tractor may be hitched when it is desired to pull the harrow structure endwise through a gate which is too narrow for it to pass through when drawn by the ring 12. The chains 14 and 16 can be swung back on the frame during this operation.

The ends of the draw bar 10 are provided with removable extensions so that the end harrows can be used or omitted as desired. The bar 22 may also be provided with end extensions 22a for the same purpose.

I preferably provide auxiliary harrow teeth 46a secured to angularly arranged bars 62 in a manner similar to that shown in Figure 2a. The ends of these bars are twisted a quarter turn and secured to the spokes 32 as by rivets 65, as shown in Figure 2.

Sometimes it is desirable to harrow the ground with a single horse, yet do an exceptionally good job. This is readily accomplished by connecting two of the harrow sections together by a spacer or jockey bar 36a as shown in Figure 5. In Figure 6 I show the spacer in detail. Its ends are perforated at 64 to receive the portion of the sleeve 40 between the rear ends of the draft element 36 of the forward harrow section and to receive the sleeve 40 of the rearward section, the rear end of the bar 36a being widened as at 36b so that another jockey bar and a third harrow section can be used, or as many as desired used in tandem. This is especially desirable in stumpy ground where the wheeled frame (parts 10 to 28) would be in the way. A direct hitch can then be made to the chain 38 without using any frame or draw bar as shown in Figure 1.

From the foregoing, it will be obvious that I have provided a harrow which will do a thorough job without causing any ridges in the ground and one which is self-cleaning due to the rotary motion which rolls the grass or other accumulation from the teeth. The wear on the teeth is even on all sides, so that the teeth are self sharpening as well as self-cleaning, all of this being done while the harrow is in operation performing the work for which it is intended.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a rotary self-cleaning harrow, a rim comprising a band of metal or the like, spokes for supporting said rim, a spindle rigidly connected with said spokes at the center of said rim and projecting upwardly from said spokes, a draft element having spaced ends journalling said spindle and harrow teeth secured to said rim and depending at an angle therefrom.

2. In a rotary self-cleaning harrow, a rim, spokes for supporting said rim, a spindle rigidly connected with said spokes at the center of said rim and projecting upwardly from said spokes, a draft element having spaced ends journalling said spindle and harrow teeth secured to said rim and depending at an angle therefrom.

3. In a rotary self-cleaning harrow, a rim, spokes for supporting said rim, a spindle rigidly connected with said spokes at the center of said rim and projecting upwardly from said spokes, a draft element having spaced ends journalling said spindle, harrow teeth secured to said rim and depending therefrom at an angle, auxiliary teeth supporting elements extending angularly between points on said spokes intermediate said rim and the center thereof and harrow teeth depending therefrom.

4. In a rotary harrow, a wheeled frame including a draw bar and a supporting bar and rotary harrow elements supported by said supporting bar and having draft elements connected with said draw bar.

5. In a rotary harrow, a frame including a draw bar, a supporting bar and caster wheels for supporting said bars and rotary harrow elements supported by said supporting bar and having draft elements connected with said draw bar.

6. In a rotary harrow, a frame including a draw bar, a supporting bar and caster wheels for supporting said bars, rotary harrow elements supported by said supporting bar and having draft elements connected with said draw bar and means for hitching to one end of said supporting bar for drawing said harrow endwise.

7. A rotary harrow element comprising a wheel-like frame, harrow teeth depending at an angle from the periphery thereof, a central elongated spindle rigidly connected to said frame and projecting at right angles to the plane thereof and a draft element for pulling said frame across the ground surface, said spindle being journalled in one end of said draft element.

8. A rotary harrow element comprising a wheel-like frame, harrow teeth depending at an angle from the periphery thereof, a central elongated spindle rigidly connected to said frame and projecting at right angles to the plane thereof, a bar-like draft element having a pair of spaced ends, said spindle being journalled in said ends.

9. A rotary harrow comprising a wheel-like frame, harrow teeth depending at an angle from the periphery thereof, a central elongated spindle rigidly connected to said frame and projecting at right angles to the plane thereof, a draft element for pulling said frame across the ground surface, said spindle being journalled in one end of said draft element and a wheeled frame for supporting said wheel-like frame at various elevations relative to the ground surface over which the wheels of said frame roll.

10. A rotary harrow element comprising a wheel-like frame, harrow teeth depending at an angle from the periphery thereof, a central elongated spindle rigidly connected to said frame and projecting at right angles to the plane thereof, a draft element for pulling said frame across the ground surface, said spindle being journalled in one end of said draft element, a second wheel-like frame, harrow teeth depending at an angle from the periphery thereof, a central elongated spindle rigidly connected to said second wheel-like frame and projecting at right angles to the plane thereof and a space bar for pulling said second frame, said second spindle being journalled in one end thereof and said first spindle being journalled in the other end thereof.

ELSWORTH JOSIAH SMITH.